US010086752B1

(12) United States Patent
Bobo et al.

(10) Patent No.: US 10,086,752 B1
(45) Date of Patent: Oct. 2, 2018

(54) ILLUMINABLE SEAT COVER ASSEMBLY

(71) Applicants: Demetris A. Bobo, Columbia Heights, MN (US); Adrian A. Stevens, Columbia Heights, MN (US)

(72) Inventors: Demetris A. Bobo, Columbia Heights, MN (US); Adrian A. Stevens, Columbia Heights, MN (US)

( * ) Notice: Subject to any disclaimer, the term of this patent is extended or adjusted under 35 U.S.C. 154(b) by 16 days.

(21) Appl. No.: 15/357,146

(22) Filed: Nov. 21, 2016

(51) Int. Cl.
  *B60Q 3/00* (2017.01)
  *F21V 23/04* (2006.01)
  *B60Q 3/02* (2006.01)
  *B60N 2/60* (2006.01)
  *F21V 8/00* (2006.01)
  *F21V 23/00* (2015.01)
  *F21V 23/02* (2006.01)
  *B60Q 3/233* (2017.01)
  *F21Y 115/10* (2016.01)

(52) U.S. Cl.
  CPC .............. *B60Q 3/0223* (2013.01); *B60N 2/60* (2013.01); *B60Q 3/233* (2017.02); *F21V 23/003* (2013.01); *F21V 23/023* (2013.01); *F21V 23/0407* (2013.01); *F21V 23/0435* (2013.01); *G02B 6/001* (2013.01); *G02B 6/0006* (2013.01); *F21Y 2115/10* (2016.08)

(58) Field of Classification Search
  CPC ...... B60Q 3/0223; B60Q 3/223; B60Q 3/007; B60Q 3/233
  USPC ........................................................ 362/488
  See application file for complete search history.

(56) References Cited

U.S. PATENT DOCUMENTS

| 5,709,448 A * | 1/1998 | Jennings | G02B 6/001 362/156 |
| 6,126,233 A * | 10/2000 | Gaetano | A47C 7/725 297/217.6 |
| 6,854,869 B1 * | 2/2005 | Fernandez | A47C 7/725 297/184.17 |
| 6,920,256 B2 * | 7/2005 | Murad | B60R 21/01516 250/227.16 |
| 8,162,519 B2 * | 4/2012 | Salter | B60Q 3/54 362/488 |
| 8,215,810 B2 * | 7/2012 | Welch, Sr. | B60R 13/00 362/488 |
| 8,256,945 B2 * | 9/2012 | Choquet | B60Q 3/745 362/488 |
| 8,482,430 B2 * | 7/2013 | Szczerba | G01C 21/3626 340/435 |
| 9,505,344 B1 * | 11/2016 | Bobo | B60N 2/58 |
| 9,802,535 B2 * | 10/2017 | Line | B60N 2/44 |
| 9,817,169 B2 * | 11/2017 | Wenzel | G02B 6/0005 |
| 2007/0047246 A1 * | 3/2007 | Barowski | B60Q 1/302 362/488 |
| 2015/0131303 A1 * | 5/2015 | Lim | B60Q 3/233 362/488 |

\* cited by examiner

*Primary Examiner* — Alan Cariaso
(74) *Attorney, Agent, or Firm* — Dave Alan Lingbeck

(57) ABSTRACT

An illuminable seat cover assembly for emitting various visual lighting effects including lights with various colors. The illuminable seat cover assembly includes a seat cover including a backrest portion and a seat portion; and a lighting assembly in communication with the seat cover for displaying steady, flashing and pulsating light of various colors with varying degrees of brightness and intensity.

8 Claims, 4 Drawing Sheets

ILLUMINABLE SEAT COVER ASSEMBLY

BACKGROUND OF THE INVENTION

Field of the Invention

The present invention relates to seat covers and more particularly pertains to a new illuminable seat cover assembly for emitting various visual lighting effects including lights with various colors.

Description of the Prior Art

The use of seat covers is known in the prior art. More specifically, seat covers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a seat back that has a back frame, a cushion pad attached to the back frame, and a massaging unit having a plurality of massaging elements. Another prior art includes a sound-controllable multistage massager equipped with LCD device comprising a massage mattress and a control device, wherein the control device comprises at least a microprocessor, a power supply device, a heating device, a sound controllable device, a motor driving device, a LCD driving device, and a key-in device. The massage mattress contains plural motors cooperative with the control device to achieve massage efficacy. Also another prior art includes a massaging apparatus utilizing a hand held controller including a microcontroller to actuate a plurality of vibrators positioned within a cushion using pulse width modulated signals. While these devices fulfill their respective, particular objectives and requirements, the aforementioned patents do not disclose a new illuminable seat cover assembly.

SUMMARY OF THE INVENTION

The general purpose of the present invention, which will be described subsequently in greater detail, is to provide a new illuminable seat cover assembly which has many of the advantages of the seat covers mentioned heretofore and many novel features that result in a new illuminable seat cover assembly which is not anticipated, rendered obvious, suggested, or even implied by any of the prior art seat covers, either alone or in any combination thereof. The present invention includes a seat cover including a backrest portion and a seat portion, and also includes a lighting assembly in communication with the seat cover for displaying steady, flashing and pulsating light of various colors with varying degrees of brightness and intensity. None of the prior art includes the combination of the elements of the present invention.

There has thus been outlined, rather broadly, the more important features of the illuminable seat cover assembly in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new illuminable seat cover assembly which has many of the advantages of the seat covers mentioned heretofore and many novel features that result in a new illuminable seat cover assembly which is not anticipated, rendered obvious, suggested, or even implied by any of the prior art seat covers, either alone or in any combination thereof.

Still another object of the present invention is to provide a new illuminable seat cover assembly for emitting various visual lighting effects including lights with various colors.

Still yet another object of the present invention is to provide a new illuminable seat cover assembly that can emit colors which automatically change or stay the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
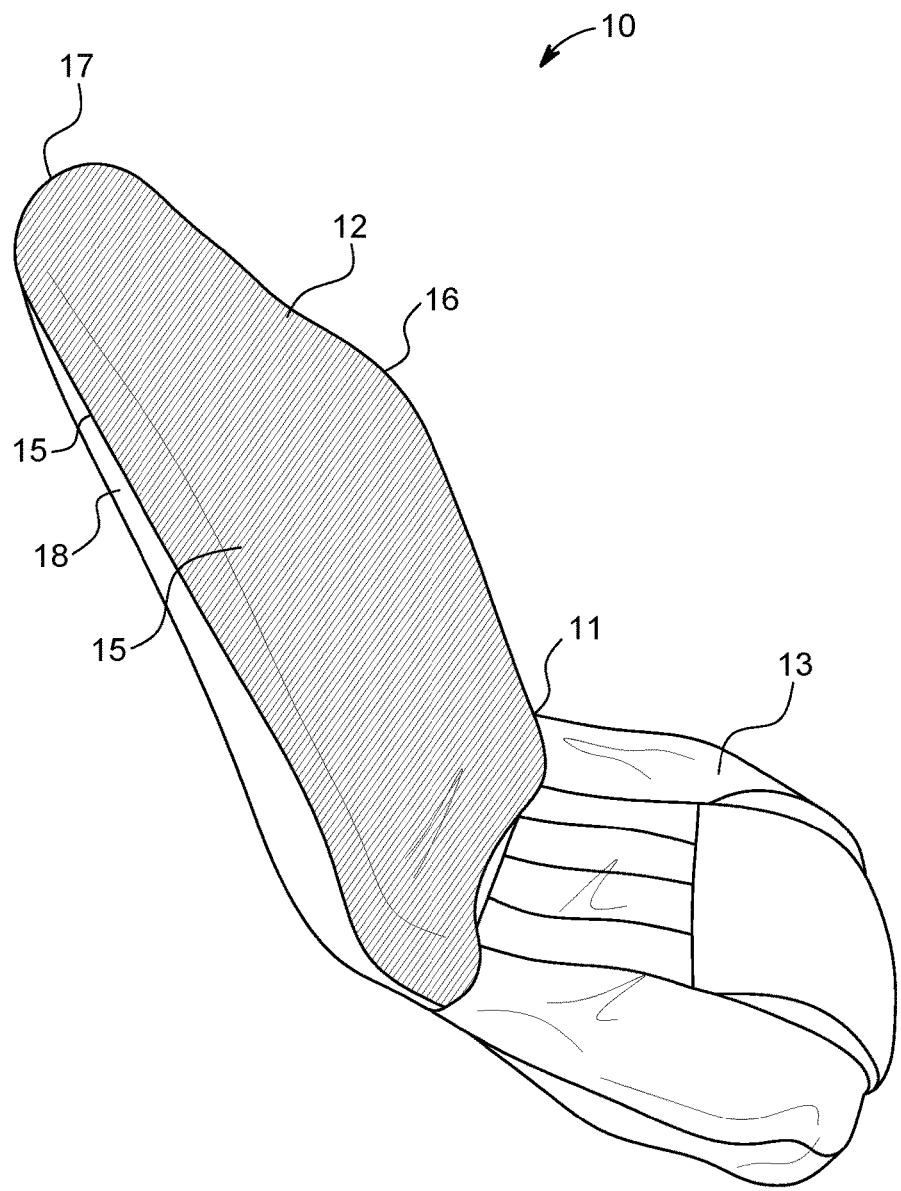
FIG. 1 is a perspective view of the seat cover assembly according to the present invention.

With reference now to the drawings, and in particular to FIGS. 1 through 4 thereof, a new illuminable seat cover assembly embodying the principles and concepts of the present invention and generally designated by the reference numeral 10 will be described.

As best illustrated in FIGS. 1 through 4, the illuminable seat cover assembly 10 generally comprises a seat cover 11 including a backrest portion 12 and a seat portion 13, and also including a lighting assembly 29 in communication with the seat cover 11 for displaying steady, flashing and pulsating lights of various colors with varying degrees of brightness and intensity.

As shown in FIGS. 1 through 4, the backrest portion 12 includes front and back covers 14, 18 having top and side edges 15-17, 19-21 with the front and back covers 14,18 securely and conventionally attached and sewn to one another along the top and side edges 15-17, 19-21 and adapted to fit about a backrest in a vehicle. The front cover 14 includes outer and inner layers of material 22, 23. The outer layer of material 22 is fiber optic fabric which includes woven optical fibers 24 with an opaque coating 25 about the optical fibers 24 and openings 26 spaced along the optical fibers 24 to allow light to be emitted from the fiber optic fabric. The woven optical fibers 24 are arranged longitudinally side by side to form rows and traverse from one of the side edges 19 to the other of the side edges 20 of the back cover 18 to form the outer layer 22 of the front cover 14 of the backrest portion 12 which also extends from the top edge 17 of the front cover 14 to the seat portion 13.

Figure 2:
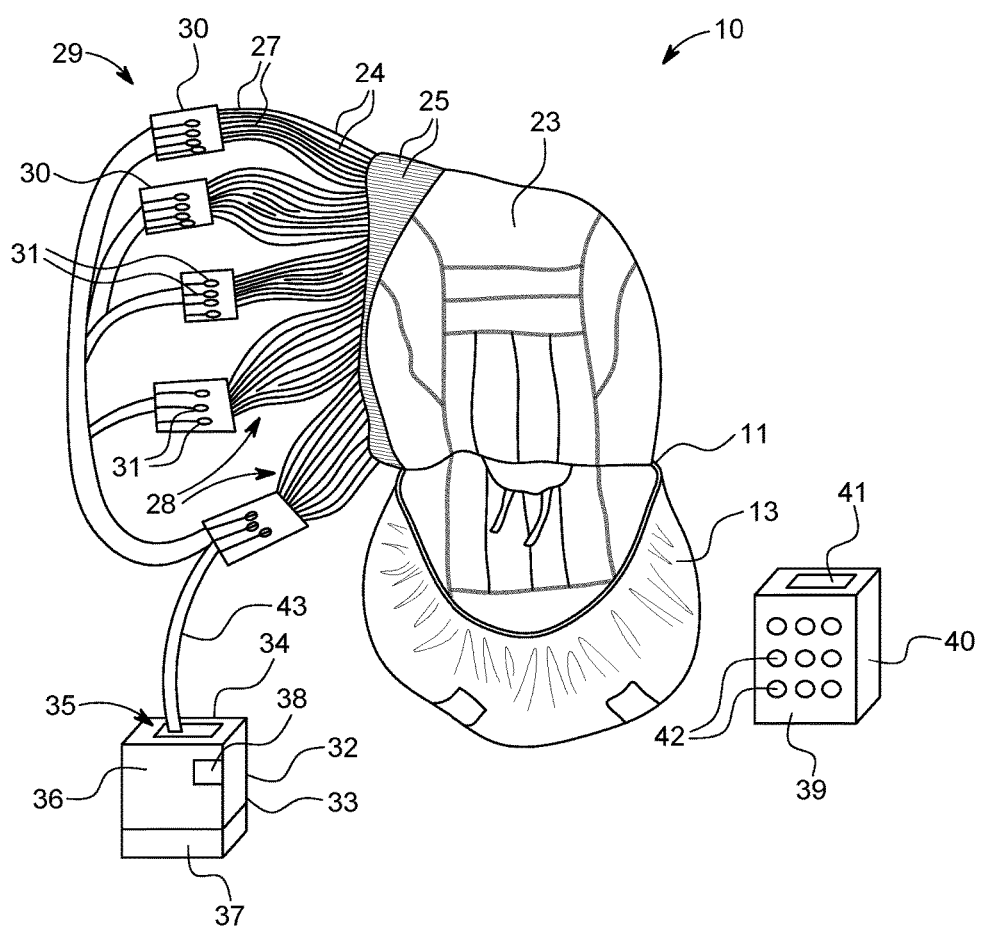
FIG. 2 is an elevation view of the backside of the front panel of the seat cover assembly.
Figure 3:
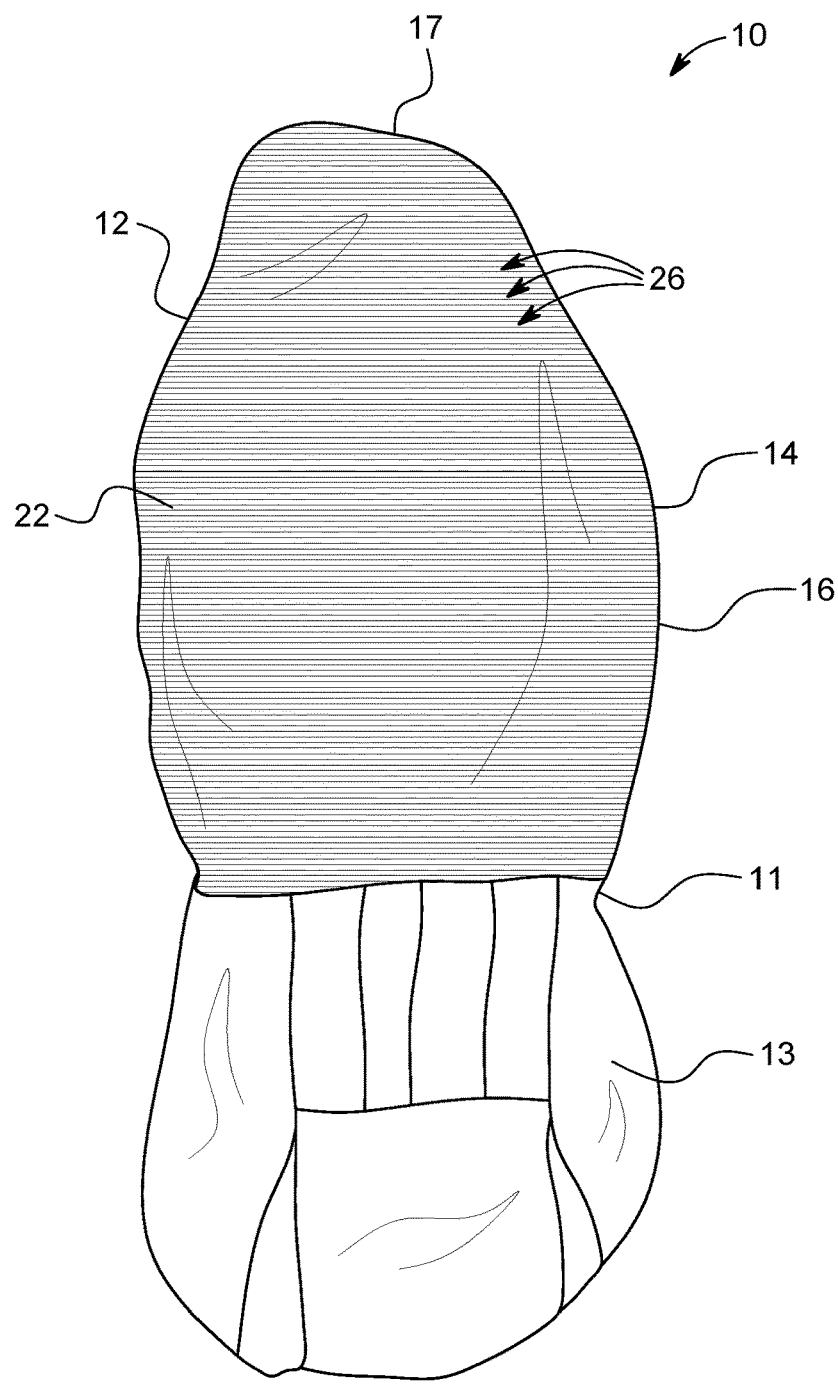
FIG. 3 is a front side elevation view of the seat cover assembly.
Figure 4:
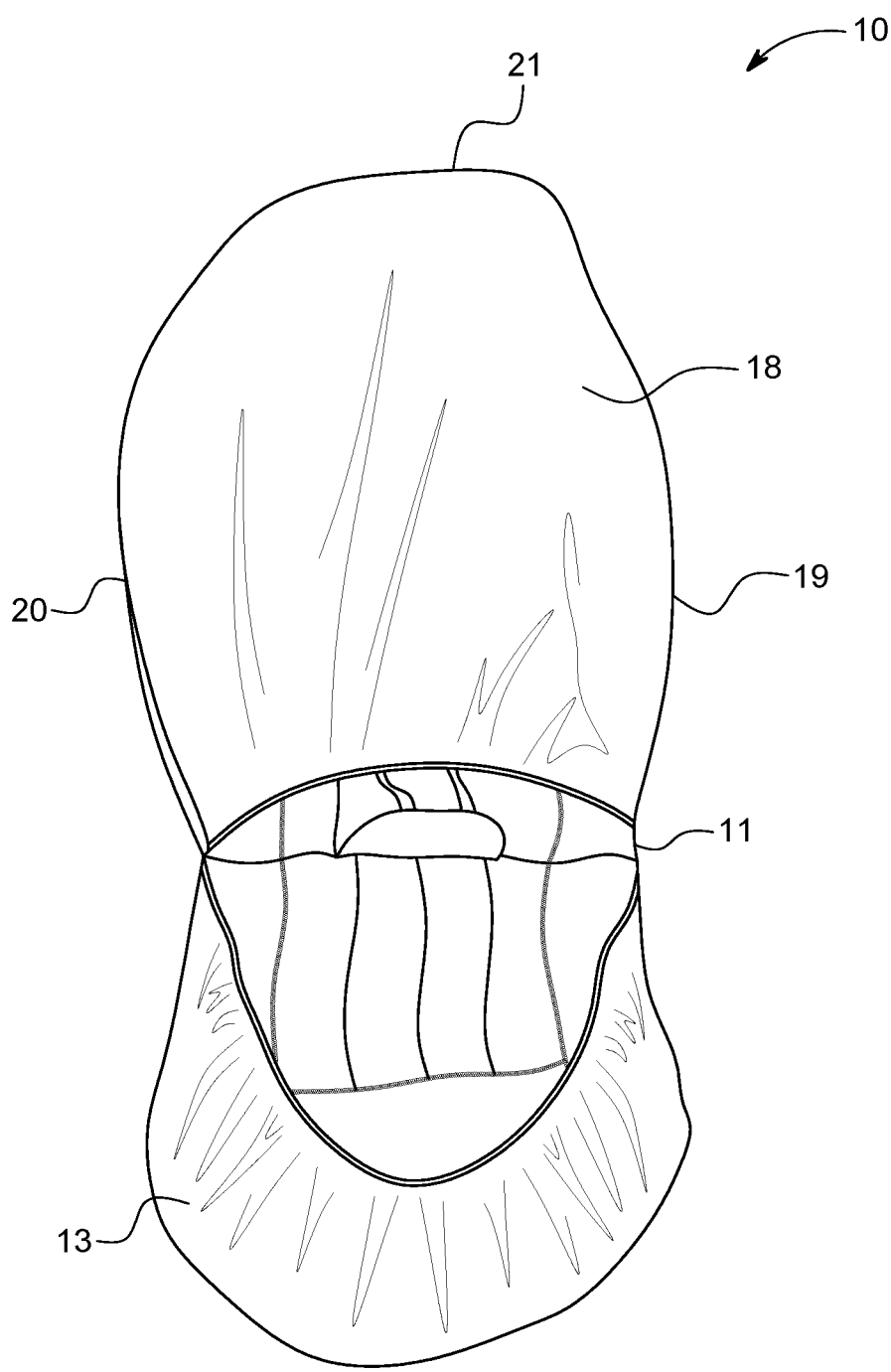
FIG. 4 is a back side elevation view of the seat cover assembly.

As illustrated in FIG. 2, the lighting assembly 29 includes sheaths 30 and light-emitting diodes 31 conventionally coupled to the optical fibers 24 and also includes a control unit 32 electrically and conventionally coupled to the light-emitting diodes 31 for energizing and effecting the light-emitting diodes 31. The optical fibers 24 are arranged transversely of the front cover 14 and may have end portions 27. The end portions 27 of the optical fibers 24 are arranged in separate groups 28. Each of the separate groups 28 includes a selected number of the end portions 27 of the optical fibers 24. The light-emitting diodes 31 emit various colors of lights. The light-emitting diodes 31 emitting various colors of lights are conventionally disposed in the sheaths 30. The end portions 27 of the optical fibers 24 in each of the groups 28 are coupled to the light-emitting diodes 31 in a respective one of the sheath 30. The control unit 32 includes a housing 33 with input and output ports 34, 35 such as USB input and output ports, and also includes a microprocessor 36, a receiver 38 and a power supply 37 disposed in the housing 33. The lighting assembly 29 also includes a transmission line 43 such as a USB cable removably and conventionally connected to the output port 35 and conventionally connected to the light-emitting diodes 31. The lighting assembly 29 further includes a remote 39 having a housing member 40, a transmitter 41 disposed in the housing member 40 and depressible switches 42 conventionally disposed upon the housing member 40 and in conventional communication with the transmitter 41 to conventionally transmit signals to the control unit 32 to energize and effect the light-emitting diodes 31.

In use, the seat cover 11 is removably disposed over a seat of a vehicle with the fiber optic fabric facing forward of the seat. The light-emitting diodes 31 is energized with a signal transmitted from the remote 39 to the control unit 32 which energizes the light-emitting diodes 31. Lighting from the fiber optic fabric may be emitted variably and steadily in various colors of light as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the illuminable seat cover assembly. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A illuminable seat cover assembly comprising:
a seat cover including a backrest portion and a seat portion, wherein the backrest portion includes front and back covers having top and side edges with the front and back covers securely attached to one another along the top and side edges and adapted to fit about a backrest in a vehicle; and
a lighting assembly in communication with the seat cover for displaying steady, flashing and pulsating light of various colors with varying degrees of brightness and intensity, wherein the front cover includes outer and inner layers of material, wherein the outer layer of material comprises fiber optic fabric which includes woven optical fibers with an opaque coating about the optical fibers and openings spaced along the optical fibers to allow light to be emitted from the fiber optic fabric, wherein the woven optical fibers are arranged longitudinally side by side and traverse from one of the side edges to the other of the side edges of the back cover to form the outer layer of the front cover of the backrest portion which extends from the top edge of the front cover to the seat portion.

2. The illuminable seat cover assembly as described in claim 1, wherein the optical fibers are arranged transversely of the front cover and have end portions, wherein the end portions of the optical fibers are arranged in separate groups, wherein each of the separate groups includes a selected number of the end portions of the optical fibers.

3. The illuminable seat cover assembly as described in claim 2, wherein the lighting assembly includes sheaths and light-emitting diodes coupled to the optical fibers and also includes a control unit electrically coupled to the light-emitting diodes for energizing and effecting the light-emitting diodes.

4. The illuminable seat cover assembly as described in claim 3, wherein the light-emitting diodes emit various colors of lights.

5. The illuminable seat cover assembly as described in claim 4, wherein the light-emitting diodes emitting various colors of lights are disposed in the sheaths, wherein the end portions of the optical fibers in each of the groups are coupled to the light-emitting diodes in a respective one of the sheaths.

6. The illuminable seat cover assembly as described in claim 3, wherein the control unit includes a housing with input and output ports, a microprocessor, a receiver and a power supply disposed in the housing.

7. The illuminable seat cover assembly as described in claim 6, wherein the lighting assembly also includes a transmission line removably connected to the output port and connected to the light-emitting diodes.

8. The illuminable seat cover assembly as described in claim 3, wherein the lighting assembly further includes a remote having a housing member, a transmitter disposed in the housing member and depressible switches disposed upon the housing member and in communication with the transmitter to transmit signals to the control unit to energize and effect the light-emitting diodes.

\* \* \* \* \*